United States Patent [19]

Forssén et al.

[11] Patent Number: 5,566,209

[45] Date of Patent: Oct. 15, 1996

[54] TRANSCEIVER ALGORITHMS OF ANTENNA ARRAYS

[75] Inventors: Ulf Forssén, Saltsjö-Boo; Björn Gudmundson, Sollentuna, both of Sweden

[73] Assignee: Telefonaktiebolaget LM Ericsson, Stockholm, Sweden

[21] Appl. No.: 195,224

[22] Filed: Feb. 10, 1994

[51] Int. Cl.$^6$ .............................. H04L 5/12; H04L 23/02
[52] U.S. Cl. ......................... 375/262; 375/341; 375/347; 375/349; 375/350
[58] Field of Search ...................................... 375/341, 262, 375/267, 347, 348, 349, 350; 371/43; 342/368, 380, 381, 382

[56] References Cited

U.S. PATENT DOCUMENTS

| | | | |
|---|---|---|---|
| 4,856,025 | 8/1989 | Takai ....................................... | 375/267 |
| 5,202,903 | 4/1993 | Okanoue ................................. | 375/349 |
| 5,305,353 | 4/1994 | Weerackody ............................ | 375/267 |
| 5,390,215 | 2/1995 | Antia et al. ............................. | 375/347 |

FOREIGN PATENT DOCUMENTS

| | | |
|---|---|---|
| 604956A2 | 7/1994 | European Pat. Off. . |
| 2266998A | 11/1993 | United Kingdom . |
| WO93/12590 | 6/1993 | WIPO . |

OTHER PUBLICATIONS

S. Anderson et al., "An Adaptive Array for Mobile Communication System", IEEE Trans. on Veh. Tech., vol. 40, No. 1, pp. 230–236 (Feb. 1991).

R. L. Dilsalvor, "Analysis of Modified SMI Method for Adaptive Array Weight Control" IEEE Trans. on Signal Processing, vol. 41, No. 2 (Feb. 1993).

W. F. Gabriel, "Adaptive Processing Array Systems", Proc. of the IEEE, vol. 8, No. 1 (Jan. 1992).

W. Kummer, "Basic Array Theory" Proc. of the IEEE, vol. 80, No. 1, pp. 173–182 (Jan. 1992).

R. Tang et al., "Array Technology", Proc. of the IEEE, vol. 80, No. 1, pp. 173–182 (Jan. 1992).

J. H. Winters, "Optimum Combining in Digital Mobile Radio with Cochannel Interference", IEEE Trans. on Veh. Tech., vol. VT–33, No. 3, pp. 144–155 (Aug. 1984).

*Primary Examiner*—Stephen Chin
*Assistant Examiner*—Don Vo
*Attorney, Agent, or Firm*—Burns, Doane, Swecker & Mathis, L.L.P.

[57] ABSTRACT

A transceiver for improving the spectral efficiency and the capacity of cellular communication systems is disclosed. The transceiver uses an antenna array for communicating in a cellular communication system with a plurality of mobile stations. In addition, the transceiver contains a spatial filter connected to an antenna array wherein the spatial filter has as many outputs as there are array elements and as many inputs as there are spatial channels. A splitter then splits data to be transmitted to each mobile station into a number of parallel data streams, the number of parallel data streams corresponds with the number of spatial channels in the system, wherein the data streams, are delayed based upon uplink measurements. Finally, power allocators are provided for allocating transmission power to each possible channel based upon long-term SNR measurements on the uplink.

48 Claims, 5 Drawing Sheets

TRANSCEIVER ALGORITHMS OF ANTENNA ARRAYS

FIELD OF THE INVENTION

Present invention relates to a cellular communication system with adaptive antenna arrays, and more particularly to a transmitter and receiver set-up for improving the spectral efficiency and the capacity of cellular communication systems.

BACKGROUND OF THE INVENTION

The cellular industry has made phenomenal strides in commercial operations in the United States as well as the rest of the world. The number of cellular users in major metropolitan areas has far exceeded expectations and is outstripping system capacity. If this trend continues, the effects of the rapid growth will soon be achieved even in the smallest markets. Innovative solutions are thus required to meet these increasing capacity needs as well as to maintain high-quality service and avoid raising prices. Furthermore, as the number of cellular users increases, the problems associated with co-channel interference become of increased importance.

Current digital cellular systems employ base stations which separate signals from mobile stations using time and frequency orthogonality. Signals from a mobile propagate to a base station and the signals are received in a single or sometimes double antenna. The receiver processes the signal using time and frequency orthogonality to separate signals from different users. It is then possible to equalize and detect the signals. While techniques such as frequency hopping and advance coding techniques provide ways to reduce the effects of co-channel interference, they are inherently limited by the available frequency spectrum. However, the use of the directional sensitivity of adaptive antenna arrays offers a new way of reducing co-channel interference. An adaptive antenna array consists of an array of spatially distributed antennas. Signals from several transmitters converge on the array from various directions. By properly combining the antenna outputs, it is possible to extract individual signals from the received superposition, even if they occupy the same frequency band. It is then possible to distinguish between spatially separated users by using narrow adaptive antenna lobes. This can be viewed as a way to utilize orthogonality in the spatial dimension.

The use of antenna arrays implies that the detector structure in a receiver must be modified. Temporal and spatial symbol interference suggests the possibility of using power from various directions in a constructive way. Spatially separated signals can not simply be added due to the temporal symbol interference. There is thus a need for a joint detection of various propagation paths. A "joint maximum likelihood sequence estimator" (MLSE) solution has been proposed for the joint detection of all mobiles using a channel. The joint MLSE solution can be implemented as a channel identification followed by a multi-input Viterbi detector, where the output of the detector is the detected data for a mobile station. However, the joint MLSE solution is prohibitively complex. The complexity grows very fast with the number of elements in the array and with the number of mobiles to be jointly detected.

Another receiver structure is disclosed in "An Adaptive Array for Mobile Communication Systems," S. Andersson et at., IEEE Trans. on Veh. Tech., vol. 40, no. 1, pp. 230–236 (Feb. 1991), in which a spatial filter is optimized by various methods and the performance is evaluated by the signal-to-noise ratio. However, this article does not discuss transmission nor the problems associated with intersymbol interference.

Yet another receiver structure is disclosed in "Optimum Combining in Digital Mobile Radio with Cochannel Interference," J. H. Winters, IEEE Trans. on Veh. Tech., pp. 144–155 (Aug. 1984), wherein the spatial filter is trained using detected data and a Least-Mean-Squares algorithm. Winters proposes that the weights from the receiver filter are also used for transmission. However, this article assumes flat fading, i.e., no intersymbol interference so that the data can be detected using one spatial filter followed by a quantizer.

Another proposed receiver solution suggests the use of a "spatial demultiplexor" using a spatial filter, computation of relative delays and coherent combination. However, this receiver solution can not handle temporal multipaths from one direction. As a result, this solution would not be feasible in systems, such as GSM, where each spatial radio channel typically creates intersymbol interference over 2 or 3 symbols.

SUMMARY OF THE DISCLOSURE

It is the object of the present invention to provide a transmitter and receiver set-up which includes a detector structure for use with antenna arrays which overcomes the complexity and intersymbol interference problems cited above with respect to conventional systems.

One embodiment of the present invention discloses a receiver with an antenna array for use in a cellular communication system containing a plurality of mobile stations. A spatial filter means contains up to one input for each antenna element of the antenna array and one output for each spatial channel wherein the output channels are grouped into one group for each mobile station. The present invention can also include a training sequence detector which detects a training sequence in the received signal from a mobile station if the training sequence is not already known. An adaption means then adjusts the spatial filters in order to enhance a desired spatial channel while suppressing other spatial channels based upon either the known or detected training sequence. The term "training sequence" is used to denote any part of the desired signal, believed to uniquely distinguish the desired signal from the interfering signals. The training sequence can be used, either directly in the adaption, or indirectly as it is used for the MLSE detection. The indirect method implies that information is feed back from the channel estimation and detection to the adaption algorithm. A channel estimation means then computes estimate impulse responses for each desired channel based on the training sequence and the output of the adjusted spatial filters. A supervising means can then determine whether the mobile stations are spatial separated by at least a predetermined amount. Finally, an MLSE detector means for each of the mobile stations detects a data signal from each mobile station from said received signals based upon the estimated impulse responses.

Another embodiment of the present invention discloses a transmitter with antenna arrays for use in a cellular communication system with a plurality of mobile stations. In addition, the transmitter contains a spatial filter connected to an antenna array wherein the spatial filter has as many outputs as there are array elements and as many inputs as there are spatial channels. A splitting means then splits data to be transmitted to each mobile station into a number of parallel data streams, the number of parallel data streams corresponds with the number of spatial channels in the system, wherein the data streams, are delayed based upon uplink measurements. Finally, power allocation means is provided for allocating transmission power to each possible channel based upon long-term SNR measurements on the uplink.

In accordance with another embodiment of the present invention, the transmitter and receiver described above can be combined into a single transceiver.

BRIEF DESCRIPTION OF THE DRAWINGS

The features and advantages of the present invention will become apparent from reading the following detailed description in conjunction with the drawings, in which.

DETAILED DESCRIPTION OF THE DISCLOSURE

The invention is primarily intended for use in base stations for digital cellular systems, for example, GSM, ADC, and PDC base stations, although it will be understood by those skilled in the art that the present invention can also be used in other various communication applications.

Figure 1:
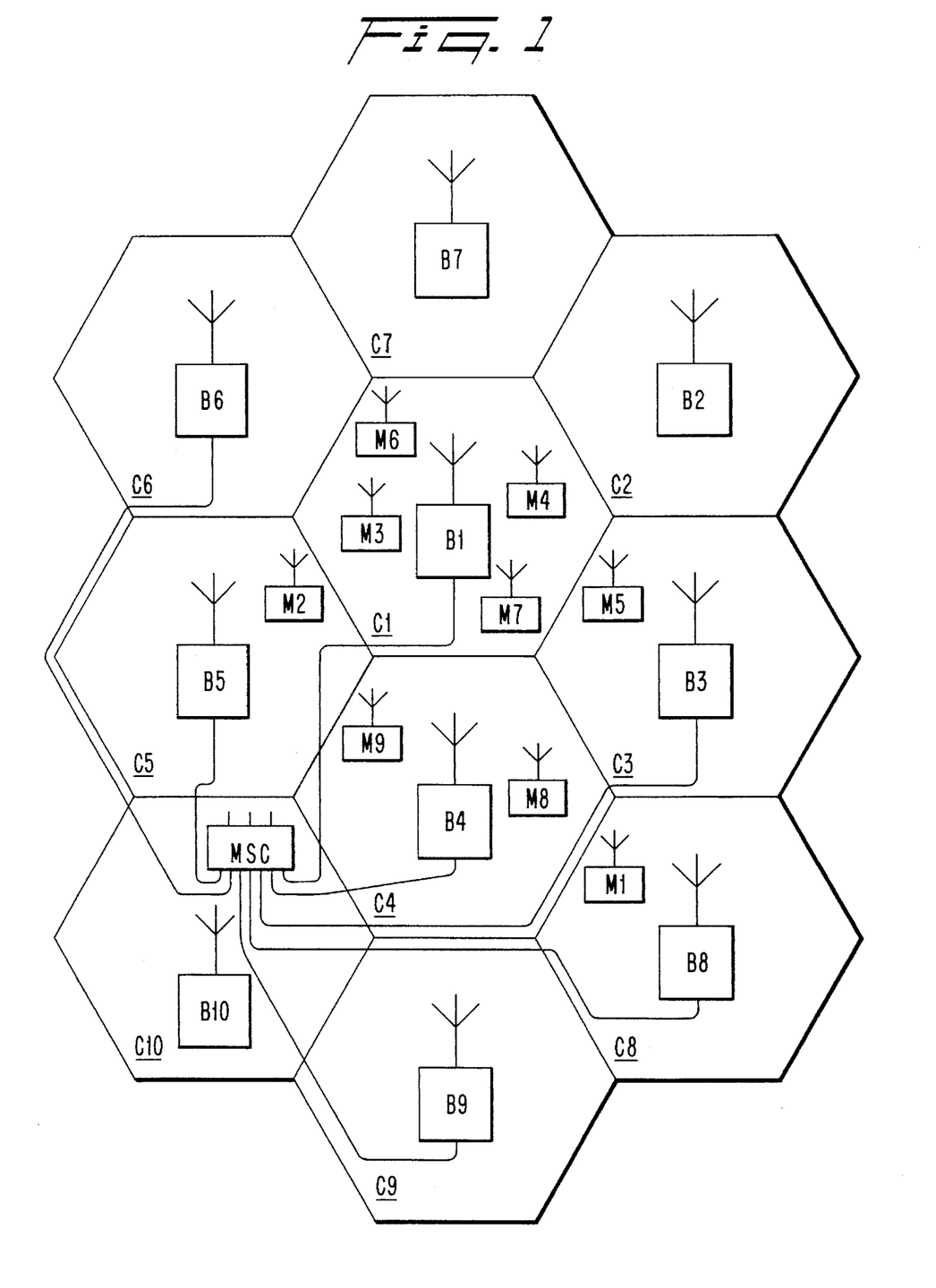
FIG. 1 illustrates a portion of a cellular mobile communication system having cells, a mobile switching center, base stations, and mobile stations.

FIG. 1 illustrates ten cells C1–C10 in a cellular mobile radio system. Normally, a cellular mobile radio system would be implemented with more than ten cells. However, for the purposes of simplicity, the present invention can be explained using the simplified representation illustrated in FIG. 1. For each cell, C1–C10, there is a base station B1–B10 with the same reference number as the corresponding cell. FIG. 1 illustrates the base stations as situated in the vicinity of the cell's center and having omni-directional antennas. According to one embodiment of the present invention at least one base station is provided with an array of antennas.

FIG. 1 also illustrates nine mobile stations M1–M9 which are movable within a cell and from one cell to another. In a typical cellular radio system, there would normally be more than nine cellular mobile stations. In fact, there are typically many times the number of mobile stations as there are base stations. However, for the purpose of explaining the present invention, the reduced number of mobile stations is sufficient.

Also illustrated in FIG. 1 is a mobile switching center MSC. The mobile switching center MSC illustrated in FIG. 1 is connected to all ten base stations B1–B10 by cables. The mobile switching center MSC is also connected by cables to a fixed switching telephone network or similar fixed network. All cables from the mobile switching center MSC to the base stations B1–B10 and cables to the fixed network are not illustrated.

In addition to the mobile switching center MSC illustrated, there may be another mobile switching center connected by cables to base stations other than those illustrated in FIG. 1. Instead of cables, other means, for example, fixed radio links may be used for connecting base stations to the mobile switching center. The mobile switching center MSC, the base stations and the mobile stations are all computer controlled.

Figure 2:
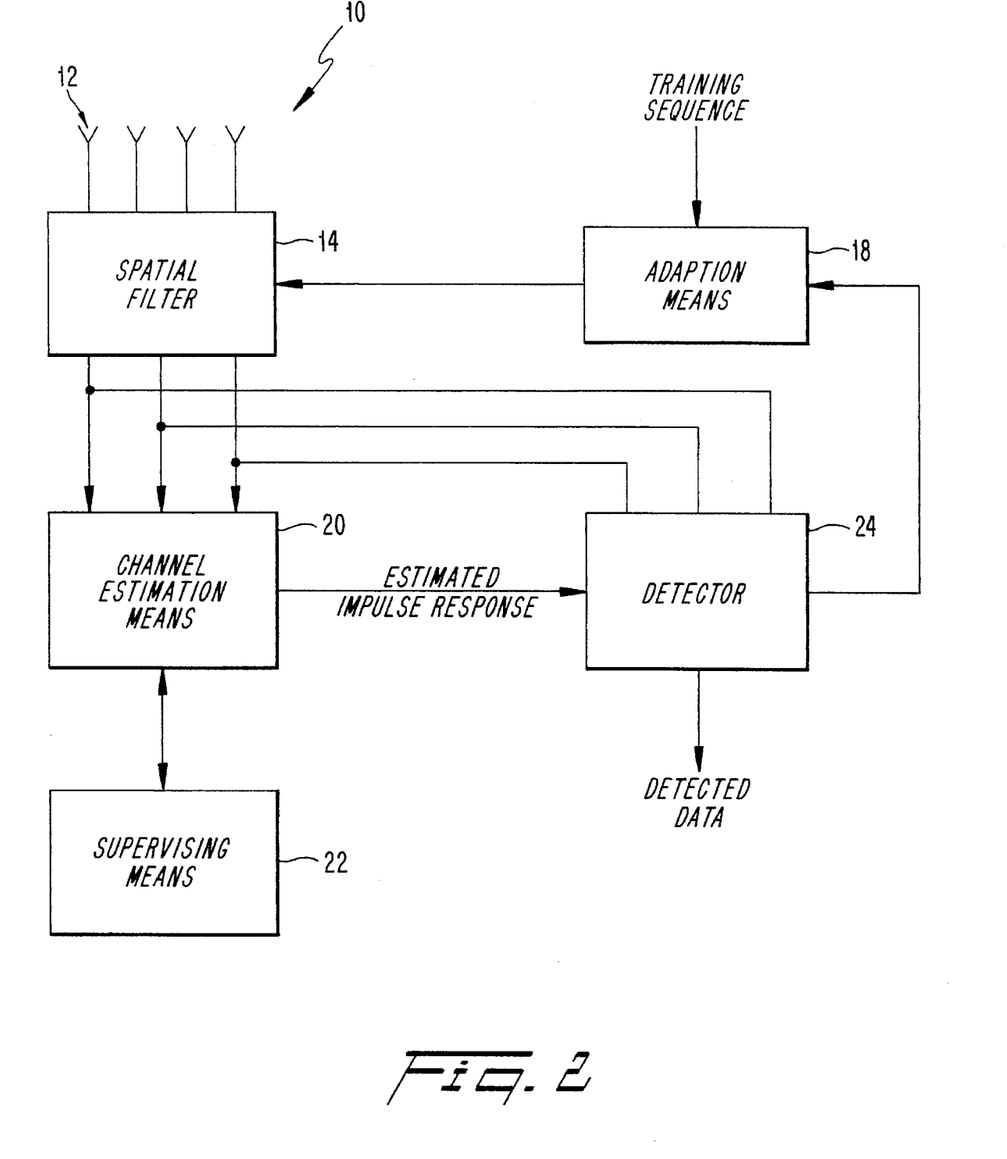
FIG. 2 illustrates a block diagram of a receiver structure for one channel according to one embodiment of the present invention.

Signals propagating between mobile stations and base stations are in the form of a number of physical approximately plane waves which have different directions of arrival at the antenna array of a base station. Each plane wave which carries a non-negligible signal power defines a spatial channel between the mobile station and the base station. FIG. 2 illustrates a block diagram of a receiver 10 according to one embodiment of the present invention which can be located at a base station. The receiver 10 has an array of antennas 12 which are spatially distributed. The antenna array 12 receives a vast number of radio signals from the mobile stations operating in the cellular system. The radio signals arriving at the array elements are temporally filtered, amplified and modulated down to baseband in a well known manner, preserving the spatial characteristics of the signal. The signal can also be preprocessed in any kind of analog beamforming, such as for example, a Butler matrix. The signals are received in a spatial filter 14. The spatial filters can be implemented at baseband as an arithmetic unit in a digital signal processor, in a ASIC or in any arithmetic unit working with digital, sampled signals. The spatial filters can also be implemented using phase shifters and variable amplification at a radio frequency or at high intermediate frequency, as described in "Array Technology", R. Tang et al., Proceedings of the IEEE, Vol. 80, No. 1, January 1992. Another possibility is to use a Butler matrix to form a number of fixed lobes, wherein the adaption network can then pick the best lobe using any optimization criteria to maximize quality.

A known training sequence is then provided to an adaption means 18. The adaption means 18 adjusts the spatial filters 14 so as to enhance a desired spatial channel while suppressing other spatial channels. The adaption means 18 can adjust the spatial filters in a variety of ways, for example, direction of arrival estimation combined with classification and weighting, direction of arrival estimation combined with least squares minimization of an error signal, direction of arrival estimation with least means squares minimization of an error signal, and direction of arrival estimation combined with a gradient optimizing method. Furthermore, the adaption means 18 can optimize the spatial filters using any known optimization method, such as, least squares, least mean squares, or gradient optimization algorithm, wherein the training sequence is used as the desired signal. One such manner is disclosed in "An Adaptive Array for Mobile Communications", Soren Andersson et al., IEEE Transactions on Vehicular Technology, Vol. 40, No. 1, pp.230–234 (Feb. 1991), which is incorporated herein by reference.

The adaption means can also pick one, or a number of filters out of a predetermined set of filters using power estimates and quality measurements from the MLSE detector. A filter which gives large power is picked and used to filter out a signal, the signal is used as an input to the MLSE detector and adaption logic judges from the quality of the MLSE output whether this is a sufficiently good filter.

A channel estimation means 20 then computes estimated impulse response signals for each desired channel based on the training sequence and upon the output from the adjusted spatial filters. The channel estimation means 20 uses the training sequences and the output of the spatial filters to compute estimated impulse response signals of the channels by using several different methods, for example, a least squares method, a least means squares method, and a gradient identification method. For example, the following algorithms can be used to compute the estimated impulse responses, wherein the output of the spatial filter is denoted y(k) and the training sequence is denoted d(k). The channel filter $H(q^{-1})$, where $q^{-1}$ is the backward shift operator $q^{-1}y(k)=y(k-1)$, is determined so that the squared difference $[y(k)-H(q^{-1})d(k)]^2$ is minimized. In other words, determine:

$$arg_H^{min} \sum_{i=1}^{N} [y(i) - H(q^{-1})d(i)]^2$$

where N is the length of the training sequence.

The receiver 10 can also contain a supervising means 22 which determines whether the mobile stations are spatially separated by at least a predetermined amount by using the spatial filters. The supervising means 22 could, for example, compute the inner product of the spatial filters used to filter out the signals from the mobile station. By denoting the filter for the first mobile station as W1 and the filter for the second mobile station as W2, the inner product between W1 and W2 can be used as a separation measure. A small product indicates almost no disturbance between the mobile stations, while a large product would indicate that the two mobile stations are close together. If it is determined that the mobiles are not separated by at least the predetermined amount, one mobile is directed to another channel.

Figure 5A:
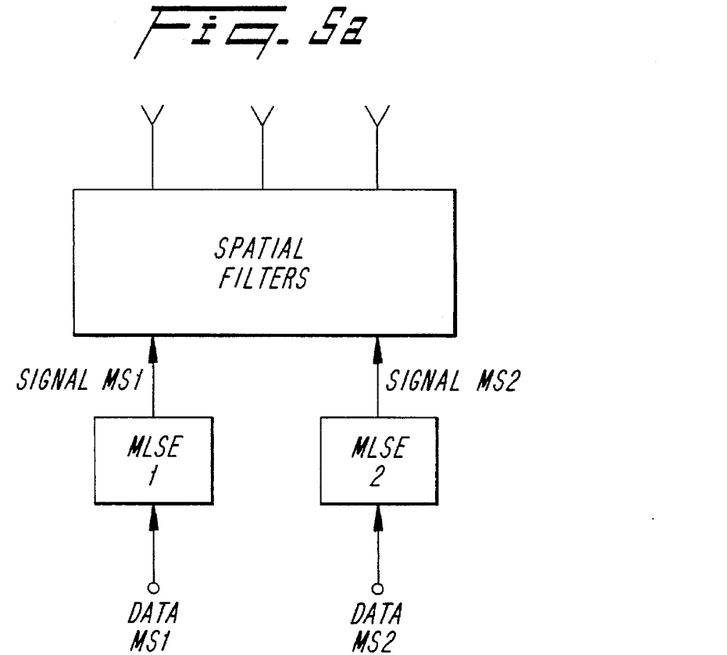
FIGS. 5(a)–(b) illustrate separate and joint detectors for individual mobile stations.
Figure 5B:
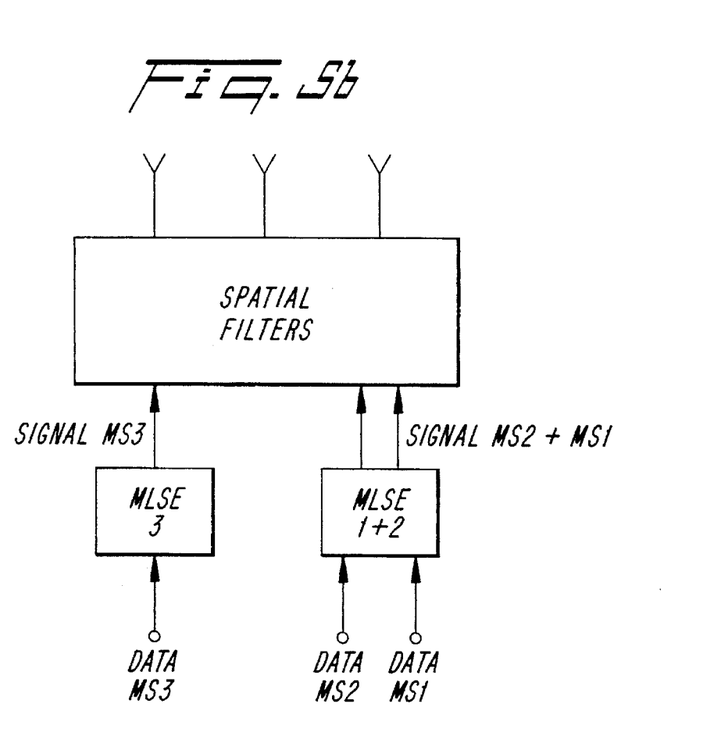

A MLSE detector 24 then uses the estimated impulse response and the output signals from the adjusted spatial filters to detect the data signal from each mobile station in the received signal. The MLSE detector can be any detector which can be used to detect a data signal transmitted through a linear filter and corrupted by noise. For example, the MLSE detector can be approximated with a decision-feedback equalizer or a linear equalizer with a threshold detector. According to one embodiment of the present invention, the MLSE detector means is implemented as a Viterbi detector or as a fractionally spaced Viterbi detector. In one embodiment of the present invention, the Viterbi detector is a multi-input, single output detector which uses the estimated impulse response signals for the channels where the inputs consist of the outputs from the spatial channels. As illustrated in FIG. 5a, separate detectors are generally provided for each mobile station when the mobile stations are sufficiently separated. However, according to one embodiment of the present invention, the supervising means can order the joint detection of non-separated mobiles in a single MLSE detector means, as illustrated in FIG. 5b, since the signals from the mobile stations, MS1 and MS2, can not be separated by linear spatial filtering.

In another embodiment of the present invention, a training sequence generator can be used to determine a training sequence in a received signal when the pre-defined training sequence is not known or is not unique. One way to create a unique sequence that can be used to adapt the antenna array is to first detect the dam burst using the antenna weights from the last burst. The entire data burst, which differs for different mobile stations, can then be used to update the antenna weights.

Figure 3:
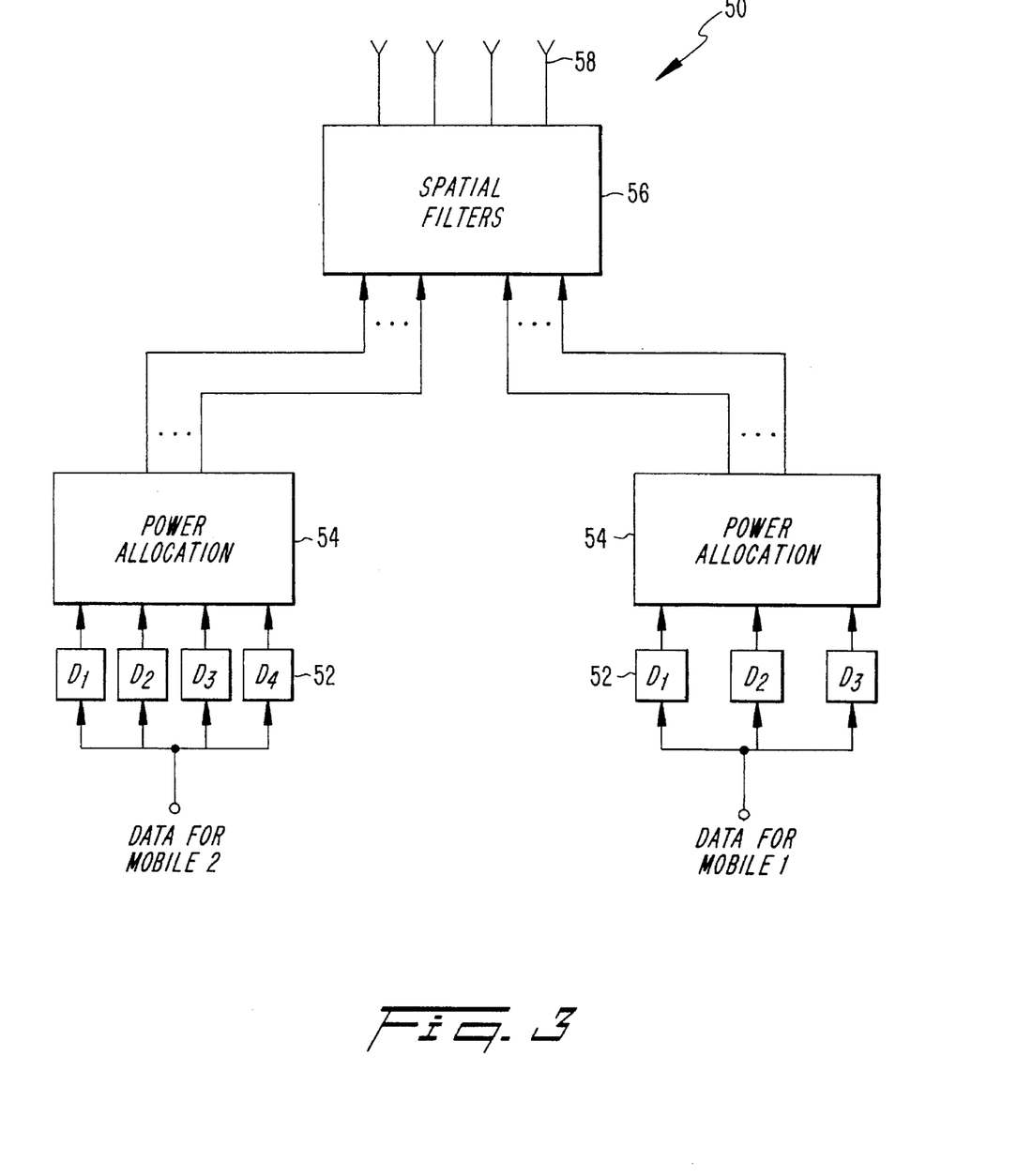
FIG. 3 illustrates a block diagram of a transmitter structure for one channel according to one embodiment of the present invention.

FIG. 3 illustrates a block diagram of a transmitter according to one embodiment of the present invention. The transmitter 50 contains data splitters 52 for splitting data to be transmitted to each mobile into a number of parallel data streams, the number of parallel data streams corresponds with the number of spatial channels in the system, wherein the data streams are delayed based upon uplink measurements. The split data is then sent to a power allocation means 54 for allocating transmission power to each possible channel using long-term SNR measurements on the uplink. For example, long term uplink measurements can be used to determine quality ratios for the spatial channels. If the uplink quality for each of the spatial channels is equal, then each spatial channel should receive the same amount of power for the downlink signals. However, if one of the spatial channels has a better uplink quality, then that spatial channel should be allocated more power for the downlink signals. The power allocation is also dependent upon the overall quality; if, for example, the C/I is low enough, there is less reason to transmit in multiple spatial channels.

The resulting signals are then sent to a spatial filter 56 which has as many outputs as there are array elements and as many inputs as there are spatial channels. The resulting signal is then transmitted to mobile stations in the system using the antenna array 58. The weights for the spatial transmit filters should be computed from the uplink measurements. For example, if different up and down link channels are used, one can average the spatial receive filter over the short-term fading, compensate the filter weights for the frequency difference, and then use the averaged and compensated filters for transmission.

Figure 4:
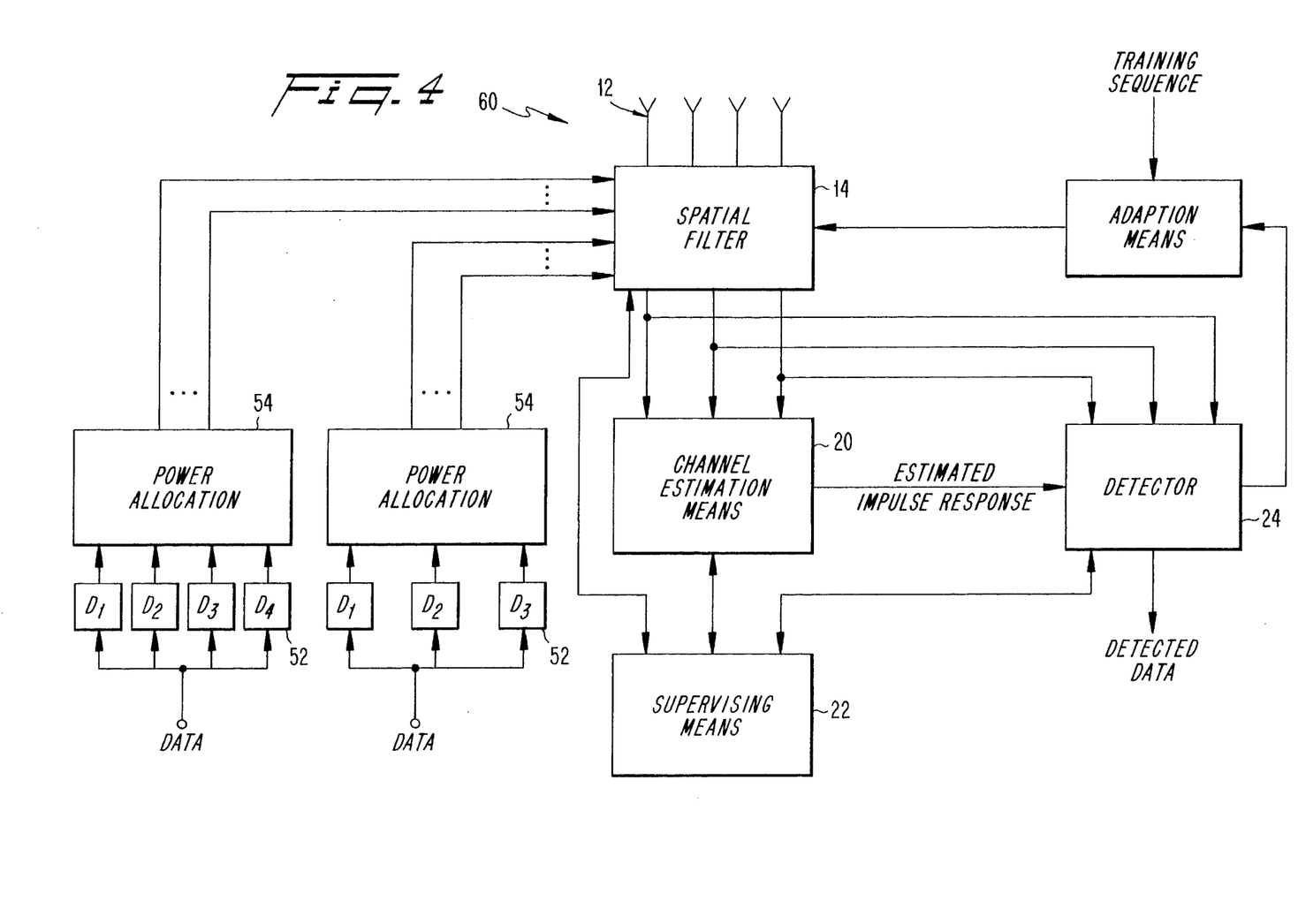
FIG. 4 illustrates a block diagram of a transceiver according to one embodiment of the present invention.

According to another embodiment of the present invention, the receiver and transmitter can be combined into a transceiver 60 as illustrated in FIG. 4. Since the components are the same as those illustrated in FIGS. 2 and 3, like numerals have been used throughout the figure, and the description for how each element of the transceiver works is as described above with reference to the descriptions of the elements of the receiver and the transmitter.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

What is claimed is:

1. A receiver using antenna arrays in a cellular-communication system including a plurality of mobile stations comprising:

means for receiving a signal;

spatial filter means with up to one input for each antenna element and one output for each spatial channel;

adaption means for adjusting the spatial filter means in order to enhance a desired spatial channel while suppressing other spatial channels;

channel estimation means for computing estimated impulse responses for each desired channel based on training sequences and said output from said spatial filters; and MLSE detector means in said receiver for each of the mobile stations for detecting a data signal broadcast from each mobile station in said received signal based on said estimated impulse responses and said outputs of said spatial filter means.

2. A receiver according to claim 1, further comprising:

means for determining a training sequence in said received signal when said training sequence is not known.

3. A receiver according to claim 1, further comprising:
supervising means for determining whether the mobile stations are spatially separated by at least a predetermined amount.

4. A receiver according to claim 3, wherein said supervising means uses said spatial filters and said estimated impulse responses in determining whether the mobile stations are spatially separated by at least a predetermined amount.

5. A receiver according to claim 3, wherein said supervising means uses information from the MLSE detector in determining whether the mobile stations are spatially separated by at least a predetermined amount.

6. A receiver according to claim 1, wherein the adaption means adjusts the spatial filters by using direction-of-arrival estimation combined with classification and weighting.

7. A receiver according to claim 1, wherein the adaption means adjusts the spatial filters by using direction-of-arrival estimation combined with least squares minimization of an error signal.

8. A receiver according to claim 1, wherein the adaption means adjusts the spatial filters by using direction-of-arrival estimation combined with a gradient optimizing method.

9. A receiver according to claim 1, wherein the adaption means optimizes the spatial filters using an optimization method and the training sequence as a desired signal.

10. A receiver according to claim 1, wherein the adaption means picks a number of filters out of a predetermined set of filters.

11. A receiver according to claim 10, wherein the adaption means picks a number of filters out of a predetermined set of filters using power estimates and quality measurements from the MLSE detector.

12. A receiver according to claim 1, wherein the estimation means uses training sequences and the output from the spatial filters to compute estimated impulse response signals of the channels by using a least-squares method.

13. A receiver according to claim 1, wherein the estimation means uses training sequences and the output from the spatial filters to compute estimated impulse response signals of the channels using a least-means-square method.

14. A receiver according to claim 1, wherein the estimation means uses training sequences and the output from the spatial filters to compute estimated impulse response signals of the channels using a gradient identification method.

15. A receiver according to claim 3, wherein the supervising means directs spatially non-separated mobiles to other channels.

16. A receiver according to claim 3, wherein the supervising means orders joint detection of non-separated mobiles in the MLSE-detector means.

17. A receiver according to claim 1, wherein the spatial filters are adjusted to enhance the signal propagating from the mobile in one or more spatial channels while suppressing other incoming signals.

18. A receiver according to claim 1, wherein the MLSE-detector means is implemented as a Viterbi detector.

19. A receiver according to claim 1, wherein the MLSE detector means is implemented as a decision-feedback detector.

20. A receiver according to claim 1, wherein the MLSE detector means is implemented as a linear equalizer followed by a threshold detector.

21. A receiver according to claim 1, wherein the MLSE detector means is implemented as a rake receiver with at least one finger.

22. A receiver according to claim 18, wherein the Viterbi detector is implemented as a fractionally spaced detector.

23. A receiver according to claim 18, wherein the Viterbi detector is a multi-input, single-output detector using the estimated impulse response signals for the channels and the inputs to the Viterbi consist of the output from the spatial filters.

24. A transmitter using antenna arrays in a cellular communication system, including a plurality of mobile stations, comprising:
means for transmitting a signal;
means for splitting data to be transmitted to each mobile into a number of parallel data streams, said number of parallel data streams corresponding to the number of spatial channels in the system, wherein the data streams are delayed based upon uplink measurements;
power allocation means connected to said means for splitting data for allocating transmission power to each possible channel using long-term SNR measurements on the uplink; and
spatial filter means connected to said power allocation means with as many outputs as there are array elements and as many inputs as there are spatial channels for providing said signal to said antenna array.

25. A transmitter according to claim 24, wherein the weights for said spatial filter means are computed from uplink measurements.

26. A transceiver using antenna arrays in a cellular communication system, including a plurality of mobile stations, comprising:
means for transmitting and receiving a signal;
spatial filter means with up to one input for each antenna element and one output for each spatial channel;
adaption means for adjusting the spatial filter means in order to enhance a desired spatial channel while suppressing other spatial channels;
channel estimation means for computing estimated impulse response signals for each desired channel based on said training sequence and said output from said spatial filters;
MLSE detector means in said transceiver for each of the mobile stations for detecting a data signal broadcast from each mobile station in said received signal based on said estimated impulse response signals and said output of said spatial filter means;
means for splitting data to be transmitted to each mobile into a number of parallel data streams, said number of parallel data streams corresponding with the number of spatial channels in the system, wherein the data streams are delayed based upon uplink measurements; and
power allocation means for allocating transmission power to each possible channel using long-term SNR measurements on the uplink.

27. A transceiver according to claim 26, further comprising:
means for determining a training sequence in said received signal when said training sequence is not known.

28. A transceiver according to claim 26, further comprising:
supervising means for determining whether the mobile stations are spatially separated by at least a predetermined amount.

29. A transceiver according to claim 28, wherein said supervising means uses said spatial filters and said estimated impulse responses for determining whether the mobile stations are spatially separated by at least a predetermined amount.

30. A transceiver according to claim 28, wherein said supervising means uses information from the MLSE detector for determining whether the mobile stations are spatially separated by at least a predetermined amount.

31. A transceiver according to claim 26, wherein the adaption means adjusts the spatial filters by using direction of arrival estimation combined with classification and weighting.

32. A transceiver according to claim 26, wherein the adaption means adjusts a spatial filters by using direction of arrival estimation with least means squares minimization of an error signal.

33. A transceiver according to claim 26, wherein the adaption means adjusts the spatial filters by using direction of arrival estimation combined with a gradient optimizing method.

34. A transceiver according to claim 26, wherein the adaption means optimizes the spatial filters using an optimization method and the training sequence as a desired signal.

35. A transceiver according to claim 26, wherein the adaption means picks a number of filters out of a predetermined set of filters.

36. A transceiver according to claim 35, wherein the adaption means picks a number of filters out of a predetermined set of filters using power estimates and quality measurements from the MLSE detector.

37. A transceiver according to claim 26, wherein the estimation means uses training sequences and the output from the spatial filters to compute estimated impulse response signals of the channels by using a least squares method.

38. A transceiver according to claim 26, wherein the estimation means uses training sequences and the output from the spatial filters to compute estimated impulse response signals of the channels using a least mean squares method.

39. A transceiver according to claim 26, wherein the estimation means uses training sequences and the output from the spatial filters to compute estimated impulse response signals of the channels using a gradient identification method.

40. A transceiver according to claim 28, wherein the supervising means directs spatially non-separated mobiles to other channels.

41. A transceiver according to claim 28, wherein the supervising means orders joint detection of non-separated mobiles in the MLSE detector means.

42. A transceiver according to claim 26, wherein the spatial filters are adjusted to enhance the signal propagating from the mobile in one or more spatial channels while suppressing other incoming signals.

43. A transceiver according to claim 26, wherein the MLSE detector means is implemented as a Viterbi detector.

44. A transceiver according to claim 26, wherein the MLSE detector means is implemented as a decision-feedback detector.

45. A transceiver according to claim 26, wherein the MLSE detector means is implemented as a linear equalizer followed by a threshold detector.

46. A transceiver according to claim 43, wherein the Viterbi detector is implemented as a fractionally spaced detector.

47. A transceiver according to claim 43, wherein the Viterbi detector is a multi-input, single output detector using the estimated impulse response for the channels and the inputs to the Viterbi consist of the output from the spatial filters.

48. A transceiver according to claim 26, wherein the weights for spatial transmit filters are computed from uplink measurements averaged over the fast fading.

\* \* \* \* \*